(12) United States Patent
Badger, II et al.

(10) Patent No.: US 11,007,846 B2
(45) Date of Patent: May 18, 2021

(54) AUTO-ISOLATE VEHICULAR CLIMATE SYSTEM

(71) Applicant: Ford Global Technologies, LLC, Dearborn, MI (US)

(72) Inventors: Charles Everett Badger, II, Westland, MI (US); Brandon Beauvais, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 388 days.

(21) Appl. No.: 15/945,766

(22) Filed: Apr. 5, 2018

(65) Prior Publication Data
US 2019/0308487 A1    Oct. 10, 2019

(51) Int. Cl.
| | | |
|---|---|---|
| *B60H 1/00* | (2006.01) | |
| *G07C 5/08* | (2006.01) | |
| *B60Q 9/00* | (2006.01) | |
| *E05F 15/70* | (2015.01) | |

(52) U.S. Cl.
CPC ..... *B60H 1/00771* (2013.01); *B60H 1/00821* (2013.01); *B60H 1/00878* (2013.01); *B60H 1/00985* (2013.01); *B60Q 9/00* (2013.01); *E05F 15/70* (2015.01); *G07C 5/08* (2013.01); *E05Y 2400/32* (2013.01); *E05Y 2900/55* (2013.01)

(58) Field of Classification Search
None
See application file for complete search history.

(56) References Cited

U.S. PATENT DOCUMENTS

| | | | |
|---|---|---|---|
| 9,487,222 B2 | 11/2016 | Palmer et al. | |
| 9,495,814 B2 | 11/2016 | Ramesh | |
| 2009/0150024 A1* | 6/2009 | Kojima | B60H 1/00771 701/36 |
| 2011/0276313 A1 | 11/2011 | Inaba | |
| 2016/0057572 A1* | 2/2016 | Bojorquez Alfaro | H04W 4/021 455/411 |
| 2016/0280160 A1* | 9/2016 | MacNeille | G05B 15/02 |
| 2016/0318368 A1* | 11/2016 | Alger | G01C 21/3453 |
| 2017/0267170 A1* | 9/2017 | Be | B60Q 9/00 |
| 2018/0326811 A1* | 11/2018 | Chelian | B60H 1/008 |
| 2019/0061467 A1* | 2/2019 | Churchwell, II | B60H 1/00771 |

* cited by examiner

*Primary Examiner* — Peter D Nolan
*Assistant Examiner* — Demetra R Smith-Stewart
(74) *Attorney, Agent, or Firm* — Michael Spenner; Brooks Kushman PC

(57) ABSTRACT

A vehicle includes a controller, in communication with a remote server, that is configured to access, from the remote server, historical climate system and window data associated with a location and route of the vehicle. The controller is further configured to identify a geofence according to the historical climate system and window data, and responsive to the vehicle crossing the geofence, command cabin air recirculation.

20 Claims, 7 Drawing Sheets

US 11,007,846 B2

AUTO-ISOLATE VEHICULAR CLIMATE SYSTEM

TECHNICAL FIELD

This disclosure generally relates to a vehicle system configured to isolate a passenger compartment from environmental conditions, more specifically operation of heating, ventilating, and air-conditioning (HVAC) and window systems including ambient air/recirculated air supplied to the passenger compartment of an automotive vehicle.

BACKGROUND

Automotive vehicles have the ability to protect passengers from the elements, for example, the doors, windows, and roof shelter a passenger compartment from wind, rain, and snow, while a climate control system (e.g., a heating, ventilating, and air-conditioning (HVAC) system) may be used to change a passenger compartment temperature to a desirable temperature and humidity. Climate control systems commonly include a blower or ventilation fan (typically powered by an electric motor) operative to force air through ducting into the vehicle passenger compartment, also known as the cabin. The air supplied to the passenger compartment may be either ambient air from outside the vehicle (fresh air) or air that is recirculated from inside the passenger compartment (recirculated air).

Typically, vehicle occupants may select between fresh air and recirculated air using a manual, two-position switch. Some climate control systems also include one or more modes where the selection between fresh and recirculated air is made automatically, without the occupant actuating a switch. An example of such an automatic setting may include when the HIGH or MAX setting of air conditioning is selected the system may switch from fresh air to recirculated air in order to speed cooling of the passenger compartment, or when a front window defrost mode is selected.

Systems have been proposed for closing powered vehicle windows (windows including, but not limited to, for example, front and rear door windows, window side vents, sunroofs, moon-roofs, and convertible roofs) in the event of rain. These systems typically use dedicated rain sensors, and perform automatic window close actions based on detected precipitation.

SUMMARY

A vehicle includes a controller, in communication with a remote server, that is configured to access, from the remote server, historical climate system and window data associated with a location and route of the vehicle. The controller is further configured to identify a geofence according to the historical climate system and window data, and responsive to the vehicle crossing the geofence, command cabin air recirculation.

A method, implemented by a controller, includes receiving a notification setting, identifying a geofence, and sending an alert. The controller receives, from a user interface, the notification settings to apply to a vehicle controller defining environmental conditions associated with a geofence. The controller identifies the geofence according to environmental data received from a remote server associated with a location of the vehicle, and responsive to the vehicle crossing the geofence, the controller sends an alert to the user interface and performing cabin isolation actions specified by the notification settings.

A vehicle includes a memory and a controller. The memory is configured to store window movement, cabin air recirculation selection, and a location of the vehicle. The controller is configured to access, from the memory, historical climate system and window data associated with a location and route of the vehicle, identify a geofence according to the historical climate system and window data, and responsive to the vehicle crossing the geofence, command cabin air recirculation.

DETAILED DESCRIPTION

Figure 1:
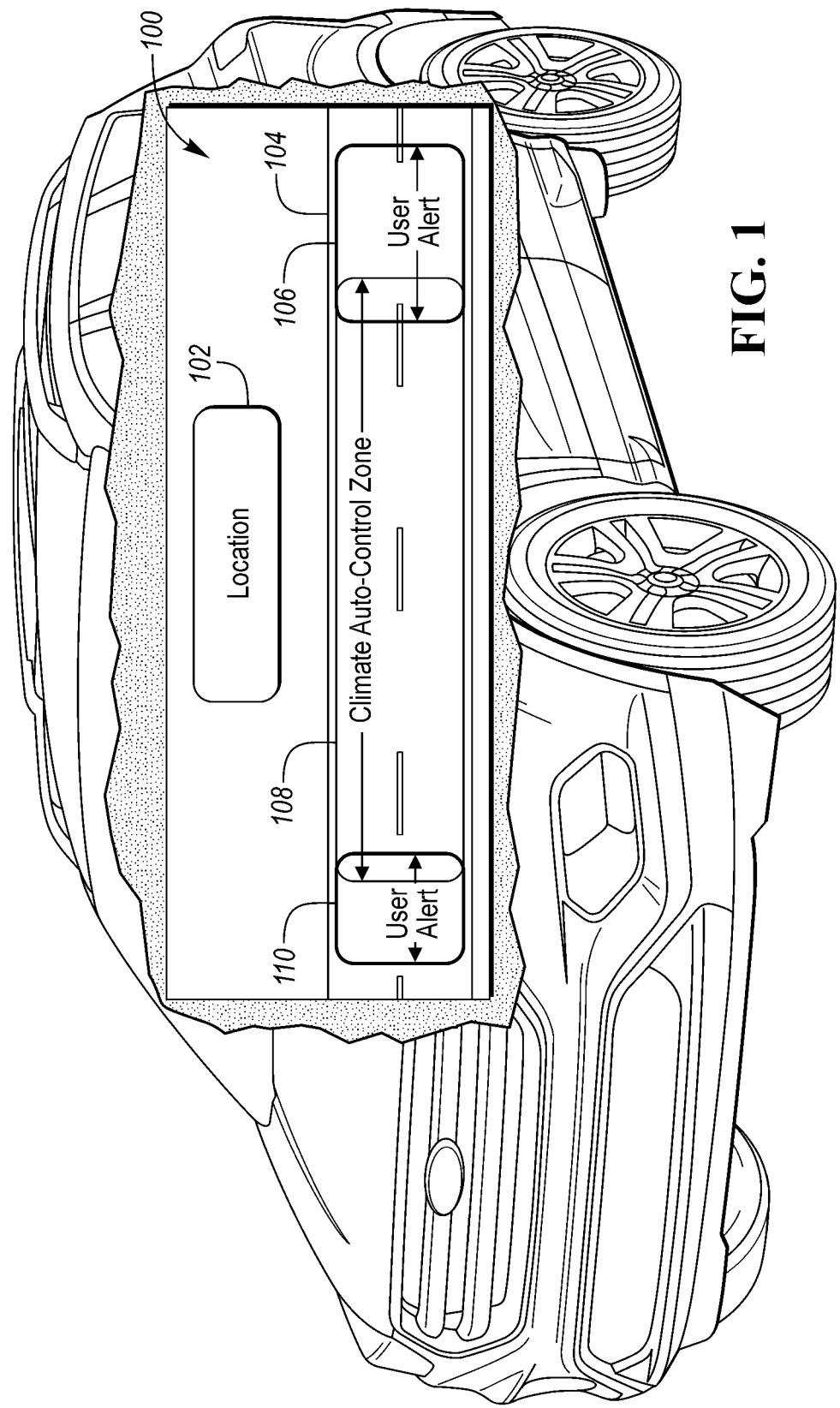
FIG. 1 is an illustration of noxious zones of a climate control system for a vehicle.

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Consider a driver driving thru an area with local air contaminants that are offensive or unpleasant to the driver. The contaminants may be strong smells like trash, skunks, dead animals, or the contaminants may be allergens that the driver is sensitive to like ragweed, cedar, cottonwood, or the contaminants may be irritants such as smog, or exhaust fumes. To reduce these contaminants from entering the passenger compartment of the vehicle, the driver may roll up the windows of the vehicle, enable re-circulation of the cabin air (to close off external air intake and reduce the addition of more of the contaminants in the occupant compartment), and activate climate control (to maintain climate or filter the air, if equipped with a cabin air filtration system). If the vehicle is not equipped with a filtration system in the climate control system, the user is limited to the air quality currently in the passenger compartment.

The ability to reduce the contaminants inside the passenger compartment is often limited by the reaction time of the driver. First, the occupant has to detect the presence of the contaminants, and then the occupant must decide if they should close the windows, while often forgetting or not thinking to enable cabin air recirculation.

Here, a system is disclosed that, via the use of predictive analysis of historical HVAC and window operation of this and other vehicles (e.g., crowd sourced data), outputs an alert for a driver of a vehicle such that they may pre-isolate their cabin before entering a zone known to have a high presence of air contaminants that other drivers may have previously reacted to. Also, the system may automatically switch the HVAC system to recirculate and close windows of the vehicle to automatically isolate the vehicle cabin prior to entering the noxious zone. The predictive analysis may include a statistical analysis such as an average, a weighted average, a median, or a mean of locations in which windows are closed or air recirculation is enabled. Along with the predictive analysis, the data may be cross-referenced this with atmospheric, traffic, and map data.

For example, a vehicle traveling down a stretch of highway, receives data (either historical data of the vehicle's operation or historical data from other vehicles stored on a server) indicative of a location at which drivers frequently roll their windows up and enable cabin air re-circulation. This data may be collected anonymously from vehicles via some form of on-board data monitoring and statistically processed to set an alert zone at which a warning, notification, or cabin isolation request may be provided. The data may be cross-referenced with point of interest (POI) information (e.g., landfill, paper mill, factory, refinery, waste-water treatment facility, livestock operation, seafood processing plant, roadkill location, fire, city center, etc.) that a location or range of locations may be noxious. The noxious output at the location may be persistent such as the landfill, paper mill, factory, refinery, waste-water treatment facility, the noxious output at the location may be seasonal such as the livestock operation or seafood processing plant, or the noxious output at the location may be transitory such as roadkill, an accident such as a tanker accident that releases a gas, or a fire (e.g., car, house, building, or wildland fire).

A vehicle with a connection to the server may utilize this information by notifying a driver that the vehicle is approaching the noxious zone in which air quality ahead may be undesirable. The system may output a recommend that the driver isolate the cabin by rolling up windows and closing off external air intake. The system may also, either upon entering the zone, after a delay from outputting the notification, or without notification, automatically roll up the windows and enable cabin air re-circulation.

If the system or driver has isolated the cabin, via rolling up windows and enabling cabin air recirculation upon entering the noxious zone, the system may output a notification when the vehicle has exited the predicted-contaminated region (i.e., noxious zone). Data can be further gathered indicating if the windows are rolled down or the cabin air ducting moves from recirculate to fresh air after exiting the region. If the vehicle cabin isolation returns to the previous state, the data may be used to help predict operation in the future.

In another example, a vehicle traveling thru a rural area may record that frequently windows are rolled up and the cabin air inlet is turned to re-circulation. This data may be cross-referenced with local air quality data to identify the irritant and using weather and wind conditions track the movement of the irritant. The irritant may include pollen, smoke from a wild fire, smog, exhaust from a factory, or other containment. The system may then adjust the noxious zone based on changes in wind direction, rain, or other environmental factors.

As the vehicle traverses into the region, the system may output a notification when in a region with a high concentration of irritants, such as air allergens. When driving towards the region, the driver is notified that local atmospheric data and cloud data suggest that irritants are high in the upcoming region. The system may then prompt isolation of the cabin air, or automatically isolate cabin air via closing windows and enabling cabin air recirculation.

FIG. 1 is an illustration 100 of a noxious location 102 such that a vehicle traveling on a road 104 passes through a noxious zone 108 from the location 102. A climate control system for a vehicle traveling along the road 104 may output a notification or alert upon entering an alert zone 106 prior to entering the noxious zone 108. Upon entrance into the alert zone 106, the vehicle may output a notification, alert, or request a confirmation to isolate the passenger compartment. The isolation may include outputting a notification to close openings such as windows, sunroof, moonroof, panoramic roof, convertible top, or T-top. Although some of the openings require the vehicle to be stopped to close, other openings may be closed automatically while the vehicle is in motion. The system may automatically close the openings such that by the time the vehicle reaches the noxious zone, the openings are closed and the cabin is substantially sealed from outside air and contaminants or irritants. Upon reaching the end of the noxious zone 108, the vehicle transverses into an exit zone 110 in which the system may output a notification that the vehicle past the area, the system may request a confirmation to return to a pre-zone state, or the system may also return the vehicle to the pre-zone state (i.e., the state prior to entering the noxious zone 108 including opening windows and transitioning from air recirculate to fresh air). Here the zones 106, 108, 110 may be defined by a geofence which is a virtual geographic boundary, defined by GPS, dead reckoning, or location determination technique, that enables a controller to trigger a response when a mobile system (such as a vehicle) enters or exits the geographic boundary.

Figure 2:
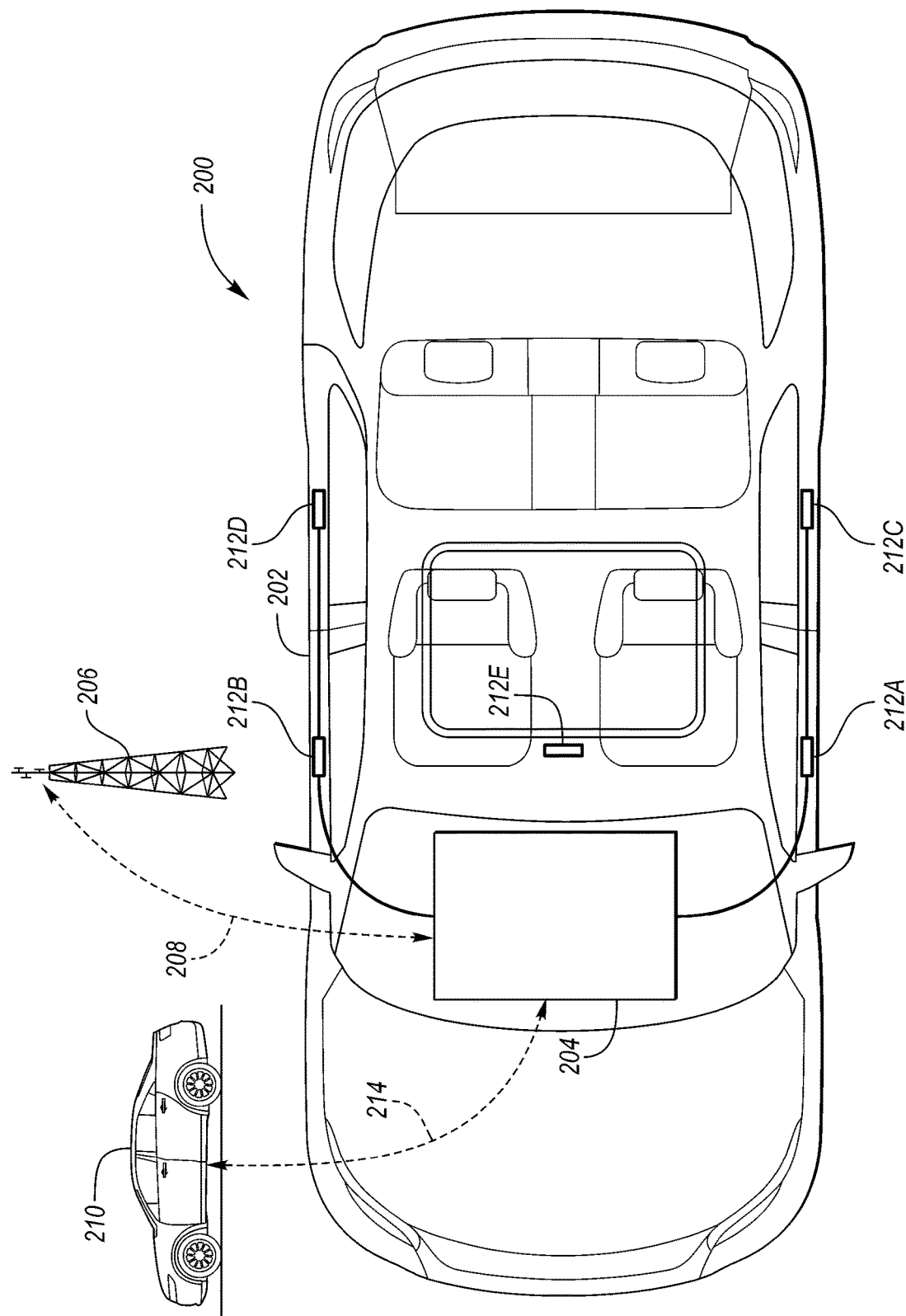
FIG. 2 is a top view of a climate control system for a vehicle.

FIG. 2 is an illustration of an environmental isolation climate control system 200 for a vehicle 202. The vehicle 202 includes a controller 204 that is configured to communicate with wireless tower 206 via a wireless connection 208 allowing access to a remote server, the Internet, or the Cloud. The connection 208 between the vehicle 202 and the tower 206 may be according to a standard such a cellular standard, (e.g., LTE, 4G, 5G) or other wireless standard (e.g., Wi-Fi). The controller 204 may also be configured to communicate with other vehicles 210 via a connection 214. The connection 214 between the vehicle 202 and the vehicle 210 may be according to a standard such as dedicated short-range communication (DSRC) that may utilize the IEEE 802.11p standard. The controller 204 may be in communication with window modules 212 such as a driver window module 212A, a passenger window module 212B, a driver side rear passenger module 212C, a passenger side rear window module 212D, and a sunroof module 212E.

Figure 3:
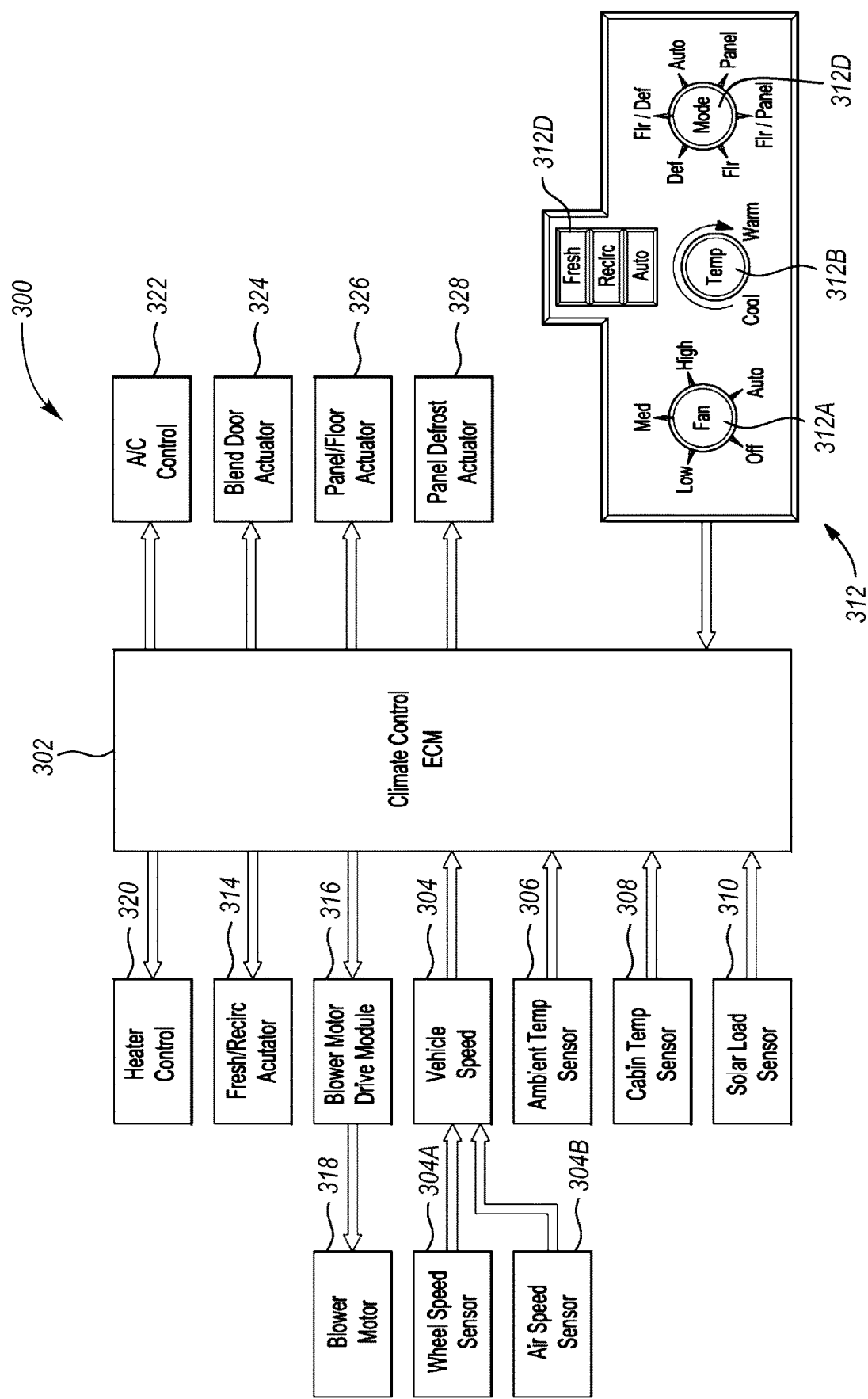
FIG. 3 is a block diagram of a climate control system for a vehicle.

FIG. 3 is a block diagram of a climate control system 300 for a vehicle. The climate control system 300 further includes a programmable electronic control module (ECM) generally designated 302. ECM 302 receives inputs from one or more sensors including (but not limited to) a vehicle speed sensor 304a, an ambient (external to the vehicle) temperature sensor 306, a passenger compartment temperature sensor 308, and a solar load sensor 310. A control assembly 312 include knobs or selectors such as fan control 312a (labeled FAN), temperature control 312b (TEMP), and mode control 312c (MODE). Control assembly 312 also provides an input to ECM 302.

Control selectors 312a-c, are used by the vehicle operator to select desired climate/comfort setting and provide input commands to the ECM 302. While control assembly 312 is depicted in FIG. 3 as comprising mechanical, rotatable knobs, it may also comprise any combination of push-buttons, touch-screen controls, a voice-actuated control system, or any appropriate means to allow operator selection of the various control settings.

Control assembly 312 may also include, as is well known in the art, a Fresh/Recirculate select switch 312d that allows an occupant to manually select between 100% fresh air (minimum recirculate), 100% recirculate air (maximum recirculate), and an AUTO setting.

Fan control 312a allows a vehicle occupant to select or command a desired air flow rate by setting a fan speed to, for example, OFF, LOW, MED, HIGH, or AUTO.

Mode selector 312c allows a vehicle occupant to select the location of the vents to which air supplied by fan 318 is directed. PANEL, FLOOR, FLR/PANEL, DEF, FLR/DEF, and AUTO settings are examples of mode settings commonly used in the automotive industry, and other possibilities and combinations exist.

As is well known in the art, ECM 302 is preferably a microprocessor-based unit that controls the various motors and actuators of the climate control system based upon the various sensor and control inputs and in accordance with programmed logic and memory.

ECM 302 controls a fresh/recirculate actuator 314, a blend door actuator 324, a panel/defrost actuator 328, and a panel/floor actuator 326, these actuators respectively moving recirculate door, temperature blend door, panel/defrost door, and panel/floor door. Actuators 314, 324, 328, and 326 are preferably electric motors, but may alternatively be any appropriate motive means, such as a vacuum system.

ECM 302 also provides control signals to a heater controller and an air conditioner controller 322 which control the amount of heating and cooling delivered by heater core and AC core respectively.

The ECM 302 controls fan motor 318 through a fan motor drive module 316 in response to fan settings of OFF, LOW, MED, HIGH, and AUTO as made by the operator using fan control 312a. In the OFF mode the ECM 302 may command fresh/recirculate actuator 314 to move F/R door to the 100% recirculate position to minimize the entry of undesirable odors into the vehicle and completely turns off all climate control components. When an air flow rate (fan speed) is selected by an occupant using fan control 312a, the ECM 302 sends a signal to the module 316 to control the speed of the fan motor 318. The set or range of fan speeds to be used may depend on the operating mode selected and may be contained in look-up tables in the memory of ECM 302.

When fan selector 312a is set to the AUTO setting, ECM 302 applies preprogrammed logic and memory to determine and direct, based upon sensor and operator control inputs, the correct temperature, mode, and fan speed required to achieve maximum comfort in the cabin. During automatic control, fan motor drive module 316 may continuously vary the fan speed by adjusting the voltage powering fan motor anywhere between zero volts (fan off) and the maximum system voltage (fan full speed). Typical passenger vehicles, at the time of this writing, utilize a 12 volt (12V) electrical system, so 12V shall be considered to equate to fan full speed for the purposes of this disclosure.

When F/R door is in the fresh position, the air flow rate (which may be measured and expressed as velocity and/or volume rate) of air entering and passing through ducting system is at least partially dependent upon the speed of the vehicle through the air mass outside the vehicle. It may be assumed that the vehicle airspeed is equal to the vehicle's ground speed as detected by wheel speed sensors 304a used by the vehicle speedometer. However, a more accurate airspeed could be measured if the vehicle is equipped with an appropriate airspeed sensor 312b. An airspeed sensor 304b could also be located within the climate control system ducting at a point where it would give an accurate indication of the velocity of the air entering or about to enter the cabin.

At relatively low fan speed settings the ram air effect of outside air entering through fresh air duct may result in the air flow into the cabin being greater than that called for by ECM 302. For a particular vehicle climate control system there is a lower vehicle speed boundary below which the ram air effect does not significantly affect the cabin air flow but above which the delivered air flow rate will be greater than desired. The lower vehicle speed boundary depends primarily on the internal configuration of the ducting and the amount of resistance to air flow provided by that configuration. Among the determining factors may be the bends and/or constrictions in the ducting and the size, type, and configuration of AC evaporator core. The critical speed for a particular model of vehicle is most accurately determined by road and/or wind tunnel testing.

ECM 302 executes a program that directs F/R door to move away from the full fresh (minimum recirculate) position and towards the full (or maximum) recirculate position so as to reduce or eliminate the undesirable ram air effect. Preferably, ECM 302 may direct F/R door to a range of intermediate positions between fresh and recirculate.

Figure 4:
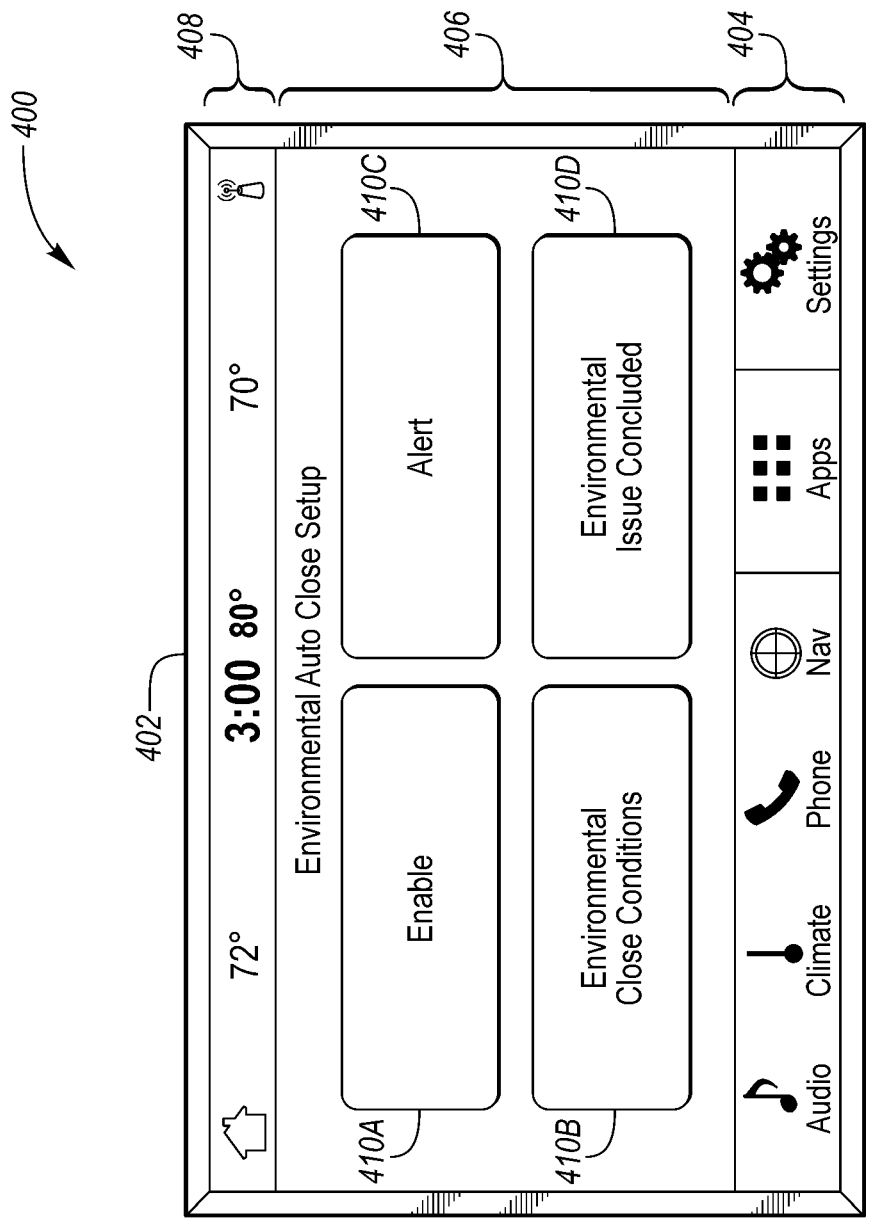
FIG. 4 is a graphical illustration of an in-vehicle display for a climate control system for a vehicle.

FIG. 4 is a graphical illustration of a user interface 400 of an environmental isolation setup menu presented on a display 402. The head unit display 402 may be driven by a video connection to a controller such as an infotainment system or a telematics control unit. The user interface 400 may include a category listing 404 of one or more icons associated with content to be displayed in the main screen area 406 of the display 402. For example, the category listing 404 may include an audio screen from which audio settings may be configured, a climate control screen from which climate control settings may be configured, a phone screen from which calling services may be utilized, a navigation screen from which maps and routing may be performed, an applications screen from which installed applications may be invoked, and a settings screen from which backlighting or other general settings of the head unit display 402 may be accessed. The user interface 400 may also include a general information area 408 from which time, current temperature, and other information may remain visible to the user, regardless of the specific screen or application that is active in the main screen area 406.

In this illustration, the environmental auto close setup screen is illustrated as selected from the category listing 404, and the main screen area 406 is illustrated as showing a listing of available setup sub windows that may be invoked. These sub windows may include, for example, an Enable item 410-A, an environmental close condition item 410-B, an Alert item 410-C, and an Environmental Issue Concluded item 410-D. Item 410-A may be used to configure the system to enable the cabin air isolation. The enable may include a level of enablement such as enabling an alert, an automatic isolation mode, or a combination thereof.

Item 410-B may be used to configure a type of alert, such as an audible alert, a visual alert, or a haptic alert. The audible alert may include a chime, bell, beep, message, or other sound, the visual alert may include a warning light or message that may be presented on an instrument cluster, a driver information console, an infotainment screen, a headsup display, or other display, and a haptic alert may include a vibrating element in a driver seat, or a steering wheel or other tactile structure.

Item 410-C may be used to configure Environmental Close Conditions. The Environmental Close Conditions may include an odor, pollen, irritants, smog, or other noxious substance. For example, a user may select to alert and isolate cabin air based on predicting odors and irritants, but not on pollen. In another example, the user may select to output an alert based on all predicted irritants, pollution, smog, odors, and pollen. In a further example, the user may select not to output an alert, but to select full auto-isolation based on all predicted irritants, pollution, smog, odors, and pollen. Full auto-isolation is automatically rolling up windows using an anti-pinch control to protect passengers, and automatically switching the cabin air input from fresh/outside air to cabin air recirculation.

Item 410-D may be used to configure Environmental Issue Concluded. The Environmental Issue Concluded conditions may include output an alert that the location has past, remain isolated, automatically return to prior state, or insert a delay past a last detected location of the noxious substance prior to initiating automatically returning to the prior state.

Figure 5:
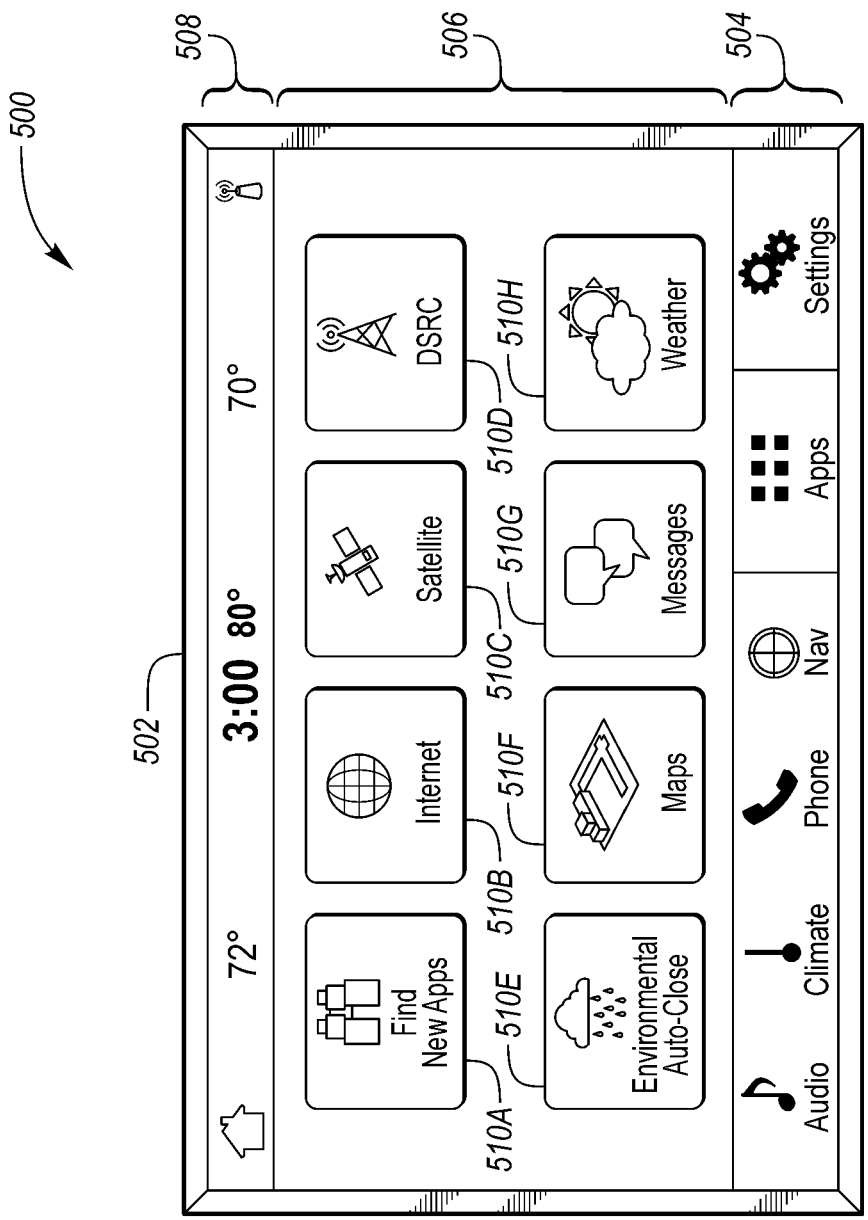
FIG. 5 is a graphical illustration of an alternate view of a graphical user interface (GUI) for an in-vehicle display for a climate control system for a vehicle.

FIG. 5 is a graphical illustration of a user interface 500 for selection of applications for use on a head unit display 502 of a vehicle. The head unit display 502 may be driven by a video connection to a controller such as an infotainment system or a telematics control unit. The user interface 500 may include a category listing 504 of one or more icons associated with content to be displayed in the main screen area 506 of the display 502. For example, the category listing 504 may include an audio screen from which audio settings may be configured, a climate control screen from which climate control settings may be configured, a phone screen from which calling services may be utilized, a navigation screen from which maps and routing may be performed, an applications screen from which installed applications may be invoked, and a settings screen from which backlighting or other general settings of the head unit display 502 may be accessed. The user interface 500 may also include a general information area 508 from which time, current temperature, and other information may remain visible to the user, regardless of the specific screen or application that is active in the main screen area 506.

In this illustration, the applications screen is illustrated as selected from the category listing 504, and the main screen area 506 is illustrated as showing a listing of available applications that may be invoked. These applications may include, for example, a find new apps item 510-A, an internet connection item 510-B, a satellite connection item 510-C, a Dedicated Short-Range Communication (DSRC) connection item 510-D, an environmental auto-close icon 510-E for selection of the notification application 120, a maps item 510-F, a messages icon 510-G, and a weather icon 510-G. Items 510-B-D may be used to configure a connection to a server to obtain POI information regarding the roadway. Item 510-E may be used to configure a thresholds and conditions used to trigger notifications and to enable auto-isolate of the cabin air. Item 510-F may be used to configure and mark maps. Item 510-E may be used to communicate with other vehicles or individuals via the connection enabled in 510-B-D. Item 510-F may be used to view local weather and weather along a predicted route of the vehicle.

Figure 6:
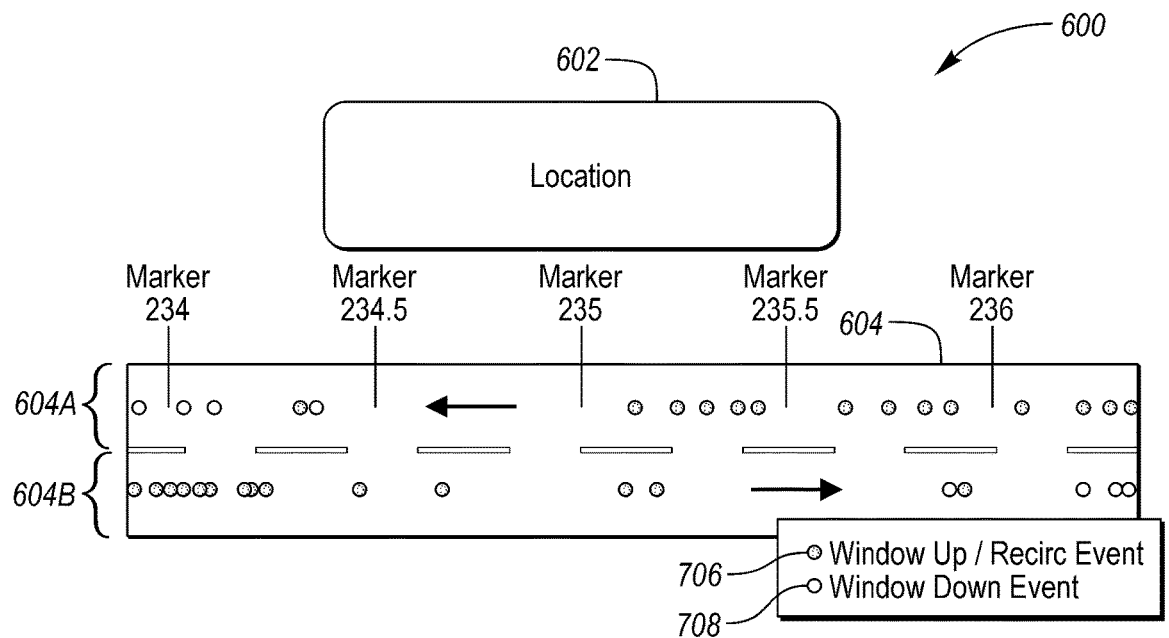
FIG. 6 is an illustration of historical climate control system changes.

FIG. 6 is an illustration of historical climate control system changes 600 near a location 602. The location 602 may be a landfill, paper mill, factory, refinery, waste-water treatment facility, livestock operation, seafood processing plant, roadkill location, fire, city center, etc. Near the location 602 is a road 604 that may be a street, highway, driveway, etc. the road shown is a two-way road with a proximate lane 604A and a distal lane 604B. The proximate lane 604A is closest to the location 602 and the distal lane 604B is further away from the location 602. As this is a two-way road, the traffic on the proximate lane 604A travels in an opposite direction as the distal lane 604B. A vehicle traveling on the road 604 may store data indicative of a cabin isolation event 606 such as window data (e.g., when the windows are rolled up) or climate system data (e.g., cabin air recirculation is enabled). Also, the vehicle traveling on the road 604 may store data indicative of a cabin non-isolation event 608 such as when the windows are rolled down or fresh air is selected as the input to cabin air. Likewise, vehicles traveling on the road 604 may send data to a remote server that may store data indicative of a cabin isolation event 606 such as when the windows are rolled up or cabin air recirculation is enabled. And, vehicles traveling on the road 604 may transmit to a remote server to store data indicative of cabin non-isolation events 608 such as when the windows are rolled down or fresh air is selected as the input to cabin air.

Figure 7:
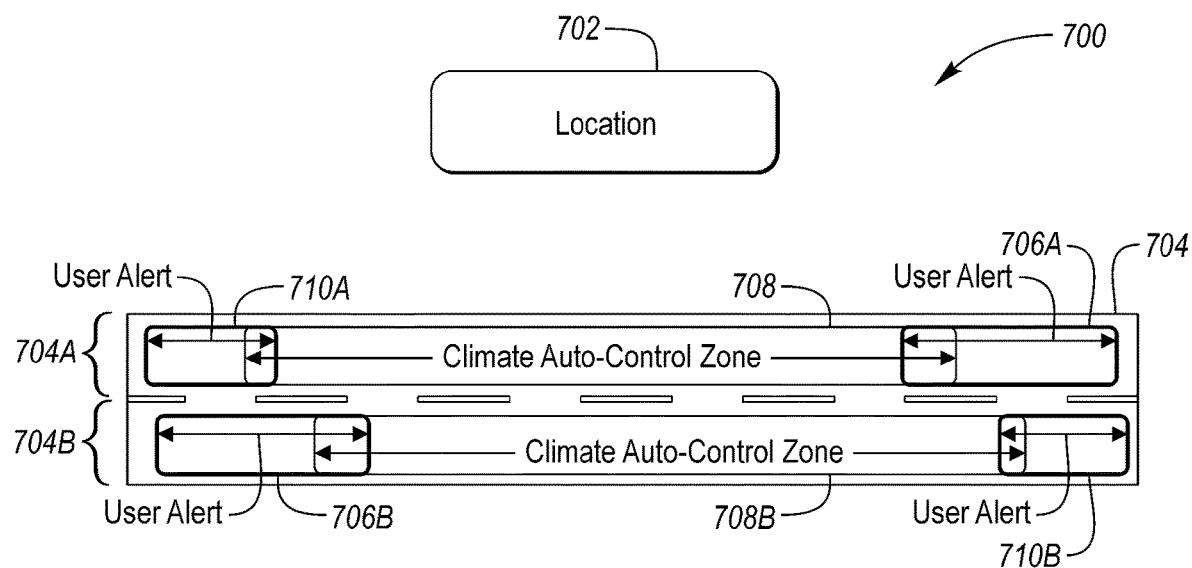
FIG. 7 is an illustration of a noxious zones for a climate control system.

FIG. 7 is an illustration of climate control system isolation zones 700 near a location 702. The location 702 may be a landfill, paper mill, factory, refinery, waste-water treatment facility, livestock operation, seafood processing plant, roadkill location, fire, city center, etc. Near the location 702 is a road 704 that may be a street, highway, driveway, etc. the road shown is a two-way road with a proximate lane 704A and a distal lane 704B. The proximate lane 704A is closest to the location 702 and the distal lane 704B is further away from the location 702. As this is a two-way road, the traffic on the proximate lane 704A travels in an opposite direction as the distal lane 704B. A controller may statically process events (e.g., cabin isolation events 606 and cabin non-isolation events 608) to provide statistical measurements (e.g., a mean, median, average, aggregate, standard deviation, or other statistical output). Based on the output, the controller may generate an alert zone 706, a cabin isolation zone 708, and an exiting transition zone 710. In this illustration, the roadway 704 is a two-way road with a proximate lane 704A and a distal lane 704B. Likewise, the controller may generate a proximate alert zone 706A, a proximate cabin isolation zone 708A, and a proximate exiting transition zone 710A. The controller may also generate a distal alert zone 706B, a distal cabin isolation zone 708B, and a distal exiting transition zone 710B.

Figure 8:
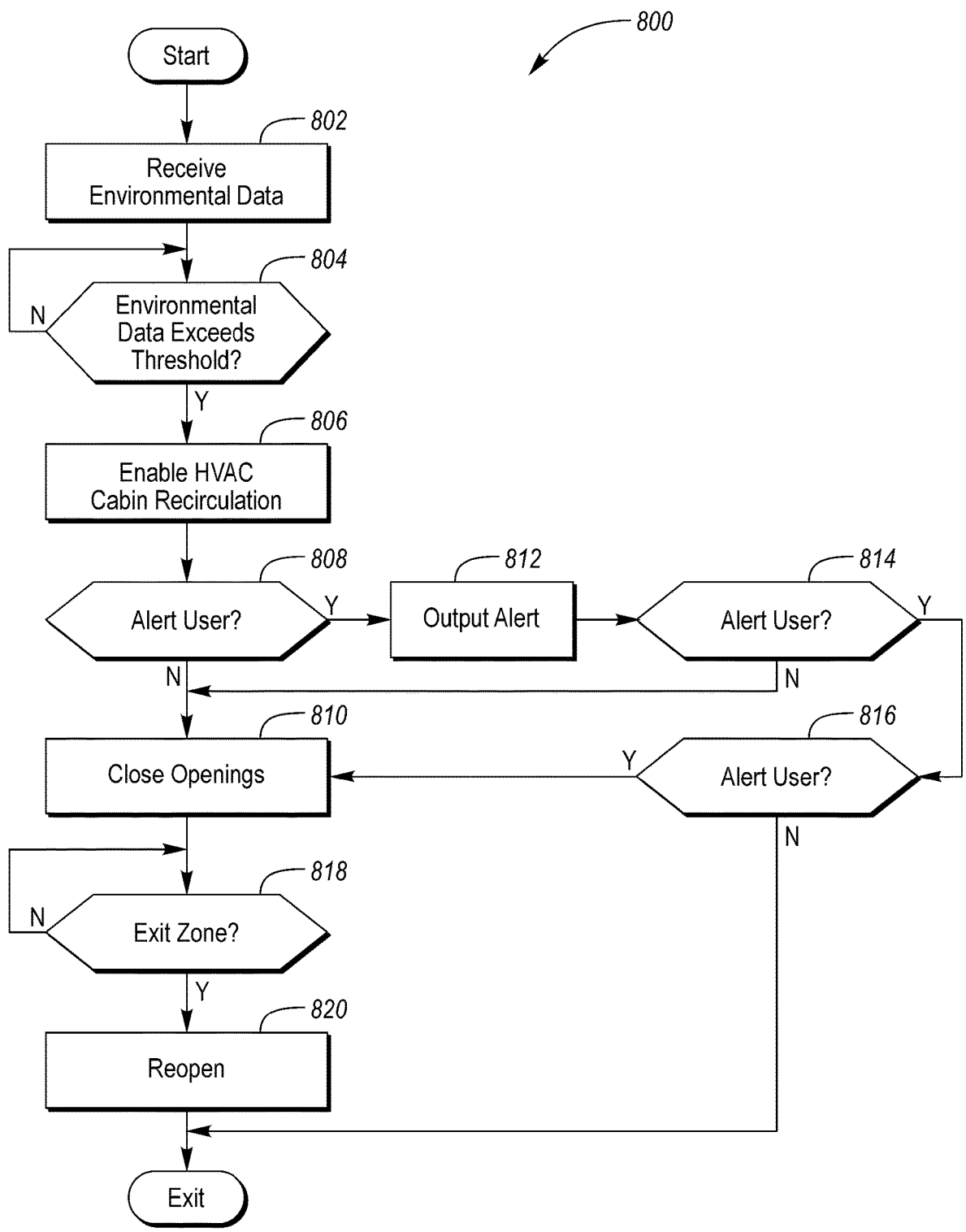
FIG. 8 is a flow diagram for a cabin isolation climate control system.

FIG. 8 is a flow diagram for a cabin isolation climate control system 800. In operation 802, a controller receives environmental data and stores a current state of windows and cabin air input source. The environmental data may include aspects of odor, particulates, chemicals, compounds, etc. The environmental data may be attributable to unpleasant conditions (e.g., pollen, pollution, smoke, smog, odors, etc.) that may emanate from a landfill, paper mill, factory, refinery, waste-water treatment facility, livestock operation, seafood processing plant, roadkill location, wild fire, city center, etc. The data may be resident in memory in the vehicle, a remote server, or another vehicle.

In operation 804, the controller branches based on a comparison of a current state of the vehicle and a threshold. The current state of the vehicle includes a current location with respect to a threshold that may include an alert zone, an isolation zone, or a non-isolation zone. The current state of the vehicle may also include a current particulate count (e.g., pollution, pollen, smog, smoke, chemicals, organic compounds, etc.) with respect to a threshold that may include a pollen sensitivity level, a pollution sensitivity level, a smoke sensitivity level, or a chemical/compound sensitivity level.

The controller may branch back to operation 802 if the detected level is less than the threshold, and branch to operation 806 if the detected level is greater than the threshold. In operation 806, the controller may enable cabin air recirculation and proceed to operation 808. In operation 808, the controller may branch based on an alert setting. If the alert setting is disabled, the controller may branch to operation 810 and automatically close windows of the vehicle thereby isolating the passenger cabin.

If the alert setting is set to output an alert, notification, or confirmation message, then the controller, in operation 812, may output an alert, notification, or confirmation message. The controller may branch in operation 814 based on if operation 812 requires a confirmation. If operation 812 does not require a confirmation, the controller branches to operation 810. If operation 812 requires a confirmation, the controller branches to operation 816. In operation 816, the controller branches based on if the confirmation is received or not. If the confirmation is received, the controller branches to operation 810, if the confirmation is not received, the controller exits.

After operation 810, the controller enters a loop in operation 818 at which the controller loops until the vehicle exits the zone, a manual override occurs, there is a key-off cycle, or a time-out. When the vehicle exits the zone, a manual override occurs, there is a key-off cycle, or a time-out, the controller proceeds to operation 820 and either reopens the windows and returns the cabin air input to fresh air, or returns the system to the state stored in operation 802.

In general, computing systems and/or devices, such as the controller, telematics control unit, and mobile device, may employ any of a number of computer operating systems, including, but by no means limited to, versions and/or varieties of the Microsoft Windows® operating system, the Unix operating system (e.g., the Solaris® operating system distributed by Oracle Corporation of Redwood Shores, Calif.), the AIX UNIX operating system distributed by International Business Machines of Armonk, N.Y., the Linux operating system, the Mac OS X and iOS operating systems distributed by Apple Inc. of Cupertino, Calif., the BlackBerry OS distributed by Research In Motion of Waterloo, Canada, and the Android operating system developed by the Open Handset Alliance.

Computing devices, such as a controller, telematics control unit, and mobile device, generally include computer-executable instructions that may be executable by one or more processors of the computing devices. Computer-executable instructions may be compiled or interpreted from computer programs created using a variety of programming languages and/or technologies, including, without limitation, and either alone or in combination, Java™, C, C++, Visual Basic, Java Script, Perl, etc. In general, a processor or microprocessor receives instructions, e.g., from a memory, a computer-readable medium, etc., and executes these instructions, thereby performing one or more processes, including one or more of the processes described herein. Such instructions and other data may be stored and transmitted using a variety of computer-readable media.

A computer-readable medium (also referred to as a processor-readable medium) includes any non-transitory (e.g., tangible) medium that participates in providing data (e.g., instructions) that may be read by a computer (e.g., by a processor of a computing device). Such a medium may take many forms, including, but not limited to, non-volatile media and volatile media. Non-volatile media may include, for example, optical or magnetic disks and other persistent memory. Volatile media may include, for example, dynamic random access memory (DRAM), which typically constitutes a main memory. Such instructions may be transmitted by one or more transmission media, including coaxial cables, copper wire and fiber optics, including the wires that comprise a system bus coupled to a processor of a computer. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein. Some or all of the operations disclosed herein as being performed by the controller may be such computer program products. In some example, these computer program products may be provided as software that when executed by one or more processors provides the operations described herein. Alternatively, the computer program products may be provided as hardware or firmware, or combinations of software, hardware and/or firmware.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their broadest reasonable constructions and their ordinary meanings as understood by those knowledgeable in the technologies described herein unless an explicit indication to the contrary in made herein. In particular, use of the singular articles such as "a," "the," "said," etc. should be read to recite one or more of the indicated elements unless a claim recites an explicit limitation to the contrary.

The abstract of the disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A vehicle comprising:
a controller, in communication with a remote server, configured to
access, from the remote server, historical climate system and window data associated with a location and route of the vehicle,
identify a geofence according to the historical climate system and window data, wherein the geofence includes an alert zone, and a climate auto control zone adjacent the alert zone,
responsive to the vehicle crossing the geofence, output an alert to close a window in the alert zone, and command cabin air recirculation in the climate auto control zone, and
responsive to receiving a user confirmation, close the window in the climate auto control zone.

2. The vehicle of claim 1, wherein the historical climate system and window data is a statistical measurement of multiple data points received from the vehicle.

3. The vehicle of claim 1, wherein the historical climate system and window data is a statistical measurement of multiple data points received from more than one vehicle.

4. The vehicle of claim 1, wherein the controller is further configured to, responsive to the vehicle crossing the geofence, close windows of the vehicle.

5. The vehicle of claim 1, wherein the controller is further configured to, responsive to receiving the confirmation, close windows of the vehicle.

6. The vehicle of claim 1, wherein the controller is further configured to store window movement, cabin air recirculation selection, and a location of the vehicle.

7. The vehicle of claim 1, wherein the controller accesses the remote server via a cellular connection.

8. The vehicle of claim 1, wherein the geofence further includes an exiting transition zone adjacent to the climate auto control zone, the controller is further configured to:
responsive to exiting the climate auto control zone, disable the cabin air recirculation and output a message to inform the user the cabin air recirculation is disabled.

9. A method, implemented by a controller, comprising:
receiving, from a user interface, notification settings to apply to a vehicle controller defining environmental conditions associated with a geofence;
identifying, by the vehicle controller, the geofence according to environmental data received from a remote server associated with a location of the vehicle, wherein the geofence includes an alert zone, and a climate auto control zone adjacent the alert zone; and
responsive to the vehicle crossing the geofence, sending an alert to the user interface to close the window in the alert zone, and performing cabin isolation actions specified by the notification settings by enabling cabin air recirculation and closing the window in the climate auto control zone.

10. The method of claim 9, wherein the notification settings specify which vehicle openings to close.

11. The method of claim 10, further comprising sending a close confirmation to the user interface indicating the cabin isolation actions were performed.

12. The method of claim 9, wherein the user interface is a graphical user interface of an in-vehicle infotainment system or an instrument cluster.

13. The method of claim 9, wherein the user interface is a graphical user interface of a mobile phone, tablet, or nomadic device that is wireless coupled with the controller.

14. The method of claim 9, wherein the controller is further configured to obtain confirmation to perform cabin isolation actions.

15. The method of claim 9, wherein the geofence further includes an exiting transition zone adjacent to the climate auto control zone, the method further comprising:
responsive to exiting the climate auto control zone, disabling the cabin air recirculation and output a message to inform the user the cabin air recirculation is disabled.

16. A vehicle comprising:
memory configured to store window movement, cabin air recirculation selection, and a location of the vehicle; and
a controller configured to
access, from the memory, historical climate system and window data associated with a location and route of the vehicle,
identify a geofence according to the historical climate system and window data, wherein the geofence includes an alert zone, and a climate auto control zone adjacent the alert zone,
responsive to the vehicle crossing the geofence, output an alert to close a window in the alert zone, and command cabin air recirculation in the climate auto control zone, and
responsive to receiving a user confirmation, close the window in the climate auto control zone.

17. The vehicle of claim 16, wherein the historical climate system and window data is a statistical measurement of multiple data points associated with the vehicle.

18. The vehicle of claim 16, wherein the controller is further configured to, responsive to the vehicle crossing the geofence, close windows of the vehicle.

19. The vehicle of claim 16, wherein the controller is further configured to, responsive to receiving the confirmation, close windows of the vehicle.

20. The vehicle of claim 16, wherein the geofence further includes an exiting transition zone adjacent to the climate auto control zone, the controller is further configured to:
   responsive to exiting the climate auto control zone, disable the cabin air recirculation and output a message to inform the user the cabin air recirculation is disabled.

* * * * *